United States Patent [19]

Macrander et al.

[11] 3,881,066

[45] Apr. 29, 1975

[54] DC SIGNALING METHOD FOR SOLID-STATE CROSSPOINT NETWORKS

[75] Inventors: Max S. Macrander, Warrenville; Ronald F. Kowalik, Lombard, both of Ill.

[73] Assignee: GTE Automatic Electric Laboratories Incorporated, Northlake, Ill.

[22] Filed: Jan. 2, 1974

[21] Appl. No.: 430,277

[52] U.S. Cl. .......... 179/18 GF

[51] Int. Cl. .......... H04q 1/28

[58] Field of Search .......... 179/18 GF, 18 AD

[56] References Cited

UNITED STATES PATENTS 3,666,892 5/1972 Hestad .......... 179/77

*Primary Examiner*—Kathleen H. Claffy
*Assistant Examiner*—C. T. Bartz

[57] ABSTRACT

Method and apparatus including a novel DC-coupled junctor circuit for signaling across a solid-state crosspoint matrix network. The junctor comprises a pair of serially connected diodes interposed between the crosspoint network paths. A constant current source (or sink) is coupled to the junction of the diodes to provide a common DC current path therethrough for current coupled through the junctor diodes and the corresponding crosspoint paths and controlled variable impedance networks coupled thereto. Signaling across the solid-state crosspoint network is accomplished by selectively varying the impedance of one of the controlled variable impedance networks responsive to certain conditions being monitored in the interface circuitry associated with the crosspoint path by a corresponding loop supervision circuit. The resultant imbalance in current through the junctor diodes causes corresponding variations in the DC potential at the other crosspoint path output terminal which are monitored to control the interface circuitry coupled thereto. In an embodiment of the invention, the novel junctor circuit is employed in an electronic private automatic branch telephone exchange (EPABX).

21 Claims, 2 Drawing Figures

DC SIGNALING METHOD FOR SOLID-STATE CROSSPOINT NETWORKS

BACKGROUND OF THE INVENTION

This invention relates generally to telephone systems and more particularly to method and apparatus including a novel DC-coupled junctor circuit for signaling across solid-state crosspoint matrix networks.

Reference may be made to the following U.S. Pat. Nos. 3,610,834; 3,720,792; 3,666,892, 3,291,915; 3,385,935; 3,513,263; 3,197,564; 3,160,852; 2,661,395; 3,714,380; and 3,729,638.

Private automatic branch telephone exchanges (PABXs) are commonly employed to channel telephone calls between a plurality of telephones served by the PABX and also to provide means for channeling outside calls arriving on one or more trunk telephone lines to the appropriate ones of the plurality of telephones served by the exchange.

With the advent of the electronic private automatic branch telephone exchange (EPABX) incorporating electronic switching systems, telephone calls to a particular telephone are now automatically connected thereto by means of a solid-state crosspoint switching network rather than manually through a switchboard operator as was at one time the practice. In particular, the solid-state crosspoint network selectively interconnects the EPABX interface circuits associated with the "calling" telephone and the "called" telephone to transmit speech signals therebetween. It also permits the interconnection of trunk lines and the EPABX interface circuit associated with a particular telephone.

More particularly, a first crosspoint path associated with a particular telephone line in the EPABX connects the line with one of a plurality of junctor circuits in the EPABX while a second crosspoint path associated with another telephone line connects the junctor to that particular telephone. That is, the solid-state crosspoint paths are interconnected by junctor curcuits interposed in the line between the crosspoint paths. In addition to supplying DC sustaining current to the electronic crosspoint networks, the junctor circuits can be utilized to perform additional test and control functions associated with the pocessing of a call. For example, the junctor is effective to forward DC ring activation current to the interface circuit associated with the called party's telephone to generate the familiar ringing signal commonly associated with incoming telephone calls. Similarly, many other functions can also be performed, such as timing conversations, restricting service and transferring calls.

Heretofore, conventional junctor circuits have generally comprised a pair of AC-coupled diodes poled to conduct current in opposite directions, each diode being selectively forward-biased by a corresponding current source pair coupled to its anode and cathode electrodes, respectively. Such a junctor network is described more fully in U.S. Pat. No. 3,513,263 entitled "Private Branch Telephone System", issued May 19, 1970, to M. Bastian et al. and assigned to International Business Machines Corporation. The AC-coupling capacitor interconnecting the diodes, while passing the AC speech signals therethrough, blocks the transmission of DC voltage changes through the junctor circuit thereby securing the correct DC crosspoint sustaining levels for both of the solid-state crosspoint paths joined by the junctor. That is, the junctor diodes insure that a minimum current level is maintained in both solid-state crosspoint paths to prevent switching transients from dropping the previously turned-on crosspoint connection between the callilng party and the junctor off while the other crosspoint connection between the junctor and the called party is being turned on. Thus, the adverse effects resulting from an imbalance in current flow through the crosspoint paths due to slight variations in the DC resistance of the crosspoint paths and/or the windings of the interface transformers commonly associated with the EPABX system are avoided.

Of course, the inclusion of an AC-coupling capacitor and four current sources in each of the junctor circuits to insure the proper turn-on of the solid-state crosspoints adds significantly to the cost of the EPABX system. Moreover, because prior art junctors have heretofore commonly been AC-coupled, auxiliary circuits have also necessarily been provided to signal across the solid-state crosspoint network and to perform other desired functions, adding to the cost of the EPABX system.

SUMMARY OF THE INVENTION

In accordance with the principles of the present invention, there is provided a method and apparatus comprising a novel DC-coupled junctor circuit for signaling across solid-state crosspoint networks. The invention is particularly useful in the environment of an electronic private automatic branch telephone exchange (EPABX) wherein interface circuits associated with the calling party's telephone and the called party's telephone are selectively interconnected by a pair of crosspoint paths in the crosspoint network and the DC-coupled junctor of the present invention which is coupled therebetween.

In an embodiment of the present invention, the junctor comprises a pair of serially connected diodes interposed between the crosspoint network paths. A constant current source (or sink) is coupled to the junction of the diodes to provide a common DC current path there- through for current coupled through the junctor diodes and the corresponding crosspoint paths and controlled variable impedance networks coupled thereto.

Signaling across the solid-state crosspoint network is accomplished by selectively varying the impedance of one of the controlled variable impedance networks responsive to certain conditions being monitored in the interface circuitry associated with the crosspoint path by a corresponding loop supervision circuit. The resultant imbalance in current through the junctor diodes causes corresponding variations in the DC potential at the other crosspoint path output terminal which are monitored to control the interface circuitry coupled thereto.

Additional means for signaling from the junctor to the crosspoint network terminals can also be provided by switching an additional constant current source (or sink) in the junctor. This also results in proportional voltage changes across the solid-state crosspoint network, providing a means for controlling conditions at the crosspoint network terminals from the junctor circuit.

Since the junctor diodes are DC-coupled and share a common current source at their junction, the AC-coupling capacitor and one of the four constant current sources heretofore required are no longer necessary.

BRIEF DESCRIPTION OF THE DRAWINGS

The invention may be best understood, however, by reference now to the following description taken in conjunction with the accompanying drawings, in which like reference numerals identify like elements in the several figures and in which.

DETAILED DESCRIPTION

Figures 1, 2:
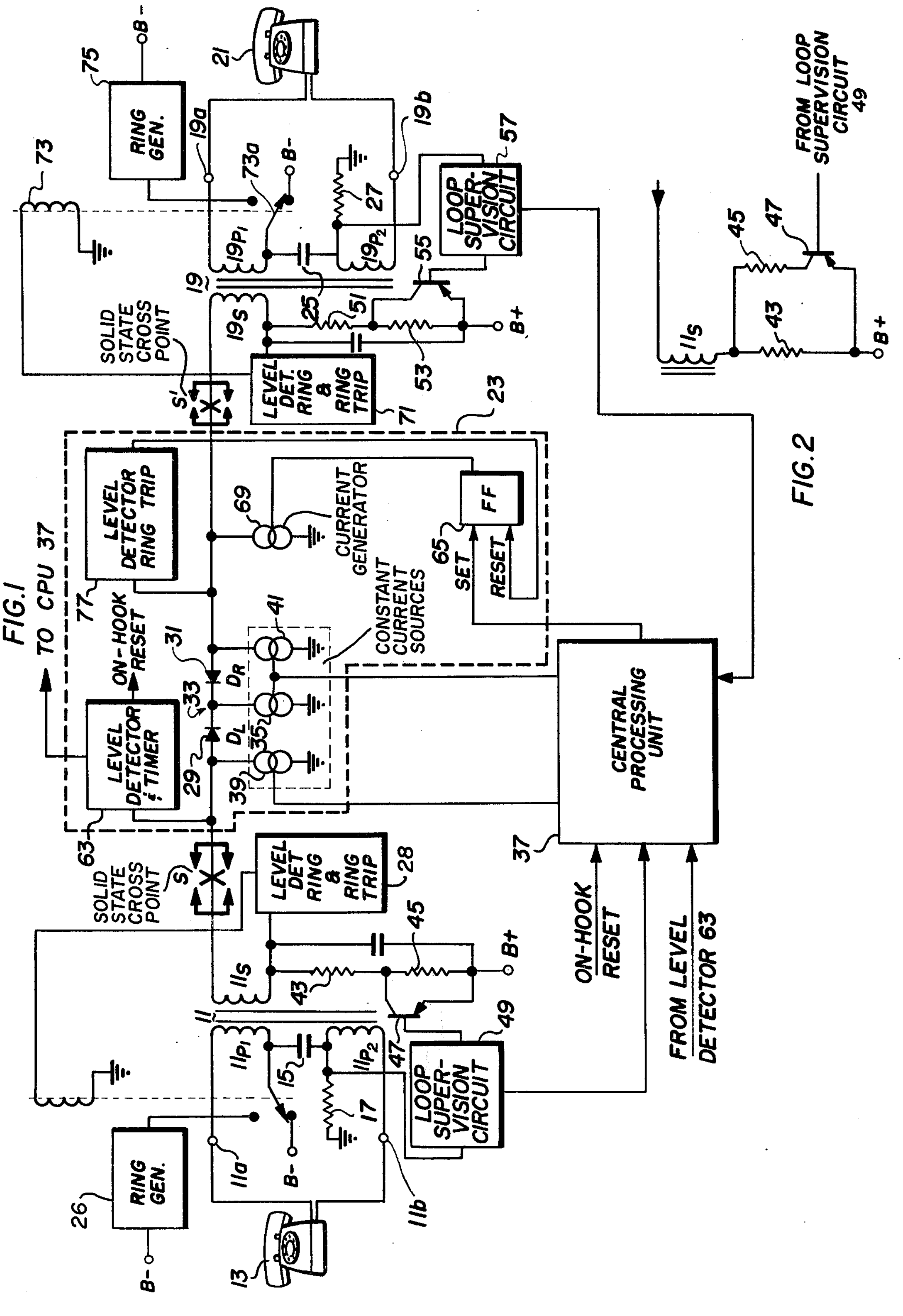
FIG. 1 is a combined schematic and block diagram of an electronic private automatic branch telephone exchange (EPABX) incorporating the novel DC-coupled junctor circuitry of the present invention.
FIG. 2 illustrates an alternative embodiment for the controlled variable impedance networks of the EPABX illustrated in Figure 1.

There is hereinafter described method and apparatus in accordance with the present invention for signaling across solid-state crosspoint networks such as those commonly included in electronic private automatic branch telephone exchanges and the like. More particularly, the electronic private automatic branch telephone exchange (EPABX) illustrated in Figure 1 incorporates a novel DC-coupled junctor which permits signaling across the solid-state crosspoint network, i.e., junctor-to-terminal and/or terminal-to-terminal, to activate, for example, the telephone ringer or to indicate other conditions in the terminal equipment such as on-off hook, dialing, or hook-switch flashing.

With reference now to FIG. 1, the electronic private automatic branch exchange shown there includes interface circuitry comprising, for example, a transformer 11 for AC coupling speech signals to and from a telephone 13 associated therewith while blocking the transmission of DC signals through the EPABX. Another interface transformer 19, selectively coupled to transformer 11 by means of a solid-state crosspoint matrix network and a novel DC-coupled junctor circuit, couples a second telephone 21 to the EPABX. For purpose of illustration only, it will be assumed in the description to follow that a call is being placed from telephone 13 (the "calling party's" telephone) to telephone 21 (the "called party's" telephone. It should be understood however, that the operation of the EPABX would be corresponding if the call were instead placed from telephone 21 to telephone 13.

As shown in Figure 1, transformer 11 comprises a pair of primary windings, $11_{p1}$ and $11_{p2}$, serially connected by capacitor 15. The junction of primary winding $11_{p1}$ and capacitor 15 is coupled to a source of negative unidirectional (B−) potential, and the junction of primary winding $11_{p2}$ and capacitor 15 is coupled to ground through resistor 17. Accordingly, the transformer primary windings $11_{p1}$ and $11_{p2}$, telephone 13, and resistor 17 provide a DC signal path between the B− potential and ground while capacitor 15 provides an AC signal path between the primary windings $11_{p1}$ and $11_{p2}$ for voice signals.

If, for example, the calling party is speaking the resultant AC speech signals developed across the secondary winding 11*s* responsive to the caller's input voice signals are, subsequently coupled to the secondary winding 19*s* of interface transformer 19. In particular, the AC speech signals are coupled through a solid-state crosspoint matrix network comprising separate crosspoint paths S and S′ wherein the switching points required to complete the connection between the calling party's telephone 13 and the called party's telephone 21 are selectively interconnected. A novel junctor circuit, identified generally at 23 in FIG. 1 and which is more fully described hereinafter, is interposed between the solid-state crosspoint paths S and S′ to provide a means for signaling across the solid-state crosspoint network.

Transformer 19, which like transformer 11 comprises a pair of primary windings, $19_{p1}$ and $19_{p2}$, connected in series by a capacitor 25 couples the Ac speech signals to and from the called party's telephone 21. Further, the junction of capacitor 25 and primary winding $19_{p1}$ is coupled to the source of B− potential, and the junction of capacitor 25 and primary winding $19_{p2}$ is coupled to ground through resistor 27.

In accordance with the present invention, the novel DC-coupled junctor circuitry 23 interposed between the solid-state crosspoint matrix paths S and S′ comprises a pair of diodes 29 and 31 having their cathodes interconnected at a common junction point 33. As shown in FIG. 1, the anode of diode 29 is coupled through crosspoint path S to transformer secondary winding 11*s* while the anode of diode 31 is connected through crosspoint path S′ to the secondary winding 19*s* of transformer 19. In addition, a constant current source 35, being responsive to a central processing unit (CPU) 37, is interconnected between junction 33 and ground. The CPU 37, which is well-known in the art, commonly comprises the circuitry for monitoring operating conditions in the EPABX and controlling the EPABX circuits in respons thereto. Similarly, constant current sources, 39 and 41, also being responsive to the CPU 37, are connected between the anodes of diodes 29 and 31, respectively, and ground.

Further, in accordance with the present invention, a controlled variable impedance network comprising a pair of serially connected resistors, 43 and 45, couples the other end of crosspoint path S to a source of positive unidirectional (B+) potential through the secondary winding 11*s* of transformer 11. The collector-emitter terminals of a transistor, 47, are coupled to opposite ends of resistor 45, and the base electrode of transistor 47 is coupled to the junction of capacitor 15 and resistor 17 through a loop supervision circuit 49. The loop supervision circuit, in turn, monitors the potential developed across resistor 17 to selectively switch transistor 47 between its conductive (ON) and non-conductive (OFF) states. Accordingly, it will be understood that any change in the potential developed across resistor 17 due to DC current variations therethrough may be sufficient to switch transistor 47 ON, i.e., into saturation, thereby providing a low impedance path shunting resistor 45.

Similarly, a second controlled variable impedance network comprising a pair of serially connected resistors 51 and 53 couples the source of B+potential to the other end of crosspoint path S′ through transformer secondary winding 19*s*. A transistor 55, shunting resistor 53 in the EPABX's interface circuitry, is responsive to a loop supervision circuit 57, which monitors the DC potential developed across resistor 27 in the primary winding circuitry, to selectively shunt resistor 53 responsive to DC potential variations across resistor 27.

The respective levels of the current drawn through the impedance networks are determined by the current conducted through the constant current sources 35, 39 and 41, which in the present embodiment operate in a manner akin to current sinks, and the ratio of the resistances of the controlled variable impedance networks. For example, when both resistors 45 and 53 are in effect shorted by the low collector-emitter impedance of the conductive transistors 47 and 55, respectively, or alternatively when transistors 47 and 55 are both nonconductive so that resistors 45 and 53 are not bypassed, both junctor diodes 29 and 31 are conductive to provide equal amounts of current through the common DC current path comprising current source 35. If on the other hand resistor 53 is bypassed while resistor 45 is not, an unbalance in the current distribution through the junctor diodes 29 and 31 results. That is, when transistor 55 is conductive and transistor 47 is nonconductive, diode 29 is reverse biased and the entire current requirement of the constant current source, i.e., sink 35, is supplied through diode 31. The increased current through diode 31 is drawn from the B+potential source through resistor 51 resulting in a decrease in the DC potential at the crosspoint network side of resistor 51. Thus, the change in DC potential resulting when transistor 47 is switched OFF can, in turn, be nomitored by a level detector in the interface circuitry associated with telephone 21. Conversely, when transistor 55 is non-conductive and transistor 47 is conductive, diode 31 is reverse biased and hence nonconductive while diode 29 is forward biased to supply the current. Thus, junctor diodes 29 and 31 are selectively forward or reverse biased responsive to DC voltage variations across resistors 17 and 27.

Accordingly, there has been shown means for signaling from terminal-to-terminal across a solid-state crosspoint matrix network whereby signaling is accomplished by selectively varying the resistance of the controlled variable impedance networks coupled through the crosspoint network to the junctor diodes responsive to certain conditions being monitored by a loop supervision circuit. It will also be appreciated that junctor-to-terminal signaling can be accomplished by selectively switching the constant current sources to vary the current therethrough and hence the potentials developed at the terminals of the crosspoint network.

While in the particular embodiment illustrated in FIG. 1 transistors 47 and 55 are shown to be of the PNP type, it should be understood that other switching devices, including NPN transistors, may be equally well adapted to this application.

An alternative embodiment which can be substituted for the serially connected resistive network coupled in series with the secondary windings of transformer 11 and transformer 19, respectively, is shown in Figure 2. There, for example, resistor 45 is shown coupled in series with the collector-emitter output circuit of transistor 47, the series combination thereof, in turn, being coupled in parallel with resistor 43. Responsive to variations in the DC potential at the junction of resistor 17 and primary winding $11_{p1}$, the loop supervision circuit 49 is effective to control the conduction of transistor 47 by varying the bias voltage applied to the base electrode thereof. Thus, resistor 45 is switched in and out of shunt with resistor 43 in response to certain operating conditions being monitored in the EPABX interface circuitry. In like manner, the series combination of resistors 51 and 53 associated with transformer 19 can be similarly modified to conform to the embodiment shown in FIG. 2.

Operationally in the embodiment shown in FIG. 1, the DC current path for the primary windings of interface transformer 11 is broken when the calling party's telephone 13 is "on-hook", and accordingly, the junction of resistor 17 and primary winding $11_{p2}$ is at ground potential. When the caller removes the handset from telephone 13 to place a call to telephone 21, the DC current path through the caller's telephone 13 is established thereby causing the potential developed at the junction of resistor 17 and primary winding $11_{p2}$ to drop below ground potential toward B−. Capacitor 13 interconnecting the two primary windings, $11_{p1}$ and $11_{p2}$, blocks any DC current flow therethrough. The drop in DC potential across resistor 17 is detected by the loop supervision circuit 49 which, in turn, applies a potential to the base electrode of transistor 47 sufficient to bias transistor 47 to conduction. When conductive, the collector-to-emitter output impedance of transistor 47 is reduced to a level at which resistor 45 is in effect bypassed or shorted.

After the called party's number has been registered the central processing unit (CPU) 37, as part of the call processing procedure enables the controlled constant current sources 35, 39 and 41 in the correct time sequence. Accordingly, the DC potential resulting at the anode of diode 29 due to the current drawn from the B+ potential source through series-connected resistors 43 and 45 by current sources 35 and 39 forward biases diode 29. Variations in DC potential at the anode of diode 29 are monitored by the level detector and timer circuit 63 which is coupled to CPU 37. The timer portion of circuit 63 delays the disablement of the level detector and timer circuit 63 so that it will not be prematurely disabled by an accidental depression of the hookswitch on telephone 13 and associated loop current interruption. If, however, loop current is interrupted for a time in excess of a set timing interval, the level detector and timer circuit 63 generates an "on-hook reset" signal which is coupled to CPU 37 to reset the logic circuitry therein. Furthermore a flip-flop 65 in the junctor circuit 23, in turn, is enabled by CPU 37 and, in turn, enables a ring activating current generator 69 which in fact acts as a current sink. Thus, additional current in excess of that already required by constant current source 41 is drawn through resistors 51 and 53 from the B+ potential source because diode 31 is reverse-biased when phone 13 is off-hook and telephone 21 is on-hook. The additional current drawn by the ring activating current generator 69 is reflected in an increased voltage drop across resistors 51 and 53 thereby lowering the potential at the junction of resistor 51 and output transformer secondary winding 19*s*. A level detector ring and ring trip circuit 71 coupled to that junction monitors the resultant decrease in DC potential at that point and responsive to the shift in DC potential enables a ring relay 73 coupled thereto. The ring relay switching element 73a is interposed between the source of B− potential and the junction of capacitor 25 and output transformer primary winding $19_{p1}$, and whenever ring relay 73 is enabled, the switching element 73*a* is switched to connect a ring generator 75 to the primary winding $19_{p1}$. Accordingly, the familiar ringing signal commonly associated with incoming telephone calls is generated by the EPABX circuitry at the called party's end.

When the called party removes the handset from his telephone 21 responsive to the ringing signal, the DC current path from the B− potential source through the ring generator 75, the primary windings of transformer 19 and resistor 27 to ground is established. The resultant drop below ground potential, i.e., toward B−, at the juction of primary winding $19_{p2}$ and resistor 27 is monitored by the loop supervision circuit 57 which, in turn, biases transistor 55 to conduction to shunt resistor 53 with the low collector-emitter output impedance of transistor 55. Accordingly, the DC potenial developed at the junction of secondary winding 19$s$ and resistor 51 increases toward B+ potential due to the decreased impedance of the combination of resistors 51 and 53. This increase in DC potential is detected by a level detector (ring trip) 77 coupled through the solid-state crosspoint path S' to the junction of resistor 51 and secondary winding 19$s$. As a result, the level detector 77, responsive to the handset being removed from the called party's telephone 21, generates a signal which resets flip-flop 56 in the junctor circuit 23 to disable the ring activating current generator 69. The current drawn from the B+ potential source through the impedance network then decreases to the level required by constant current source 41 and half the current of constant current source 35 so that the DC potential developed at the junction of the output transformer secondary winding 19$s$ and resistor 51 is sufficient to forward bias diode 31 while at the same time being effective to disable the level detector ring and ring trip circuit 71 and thus ring generator 75.

After the called party has answered the telephone call by removing the handset from telephone 21, voice signals are transmitted between the caller's telephone 13 and the called party's telephone 21 via the DC-coupled junctor 23 in the electronic private automatic branch exchange (EPABX) circuitry.

In particular, when both phones 13 and 21 are off-hook, the resistances of the controlled variable impedance networks coupled to opposite sides of the DC-coupled junctor circuit 23, i.e., the anode electrodes of diodes 29 and 31, are equal because resistors 45 and 53 are similarly shunted. As a result, the current is distributed equally between the left and right hand sides of the junctor. That is, half of the current through current source 35 is drawn through diode 29 while the other half is drawn through diode 31. Since diodes 29 and 31 share a common DC current path through the controlled constant current source 35, the AC voice signals coupled to the junctor 23, i.e., the anode of diode 29, from the caller's telephone 13 through interface transformer 11 and the solid-state crosspoint path S generate corresponding AC speech signals at the anode of diode 31. Thus, terminal-to-terminal transmission of speech signals across the EPABX solid-state crosspoint network can be effected. These AC voice signals are, in turn, transmitted through the solid-state crosspoint path S' and interface transformer 19 to telephone 21.

When the call is finished and the handset is replaced on telephone 13, the corresponding loop supervision circuit 49 in the interface circuitry detects the increased DC potential at the junction of resistor 17 and primary winding $11_{p2}$ resulting from the opening of the DC current path through telephone 13. Transistor 47 is switched to its non-conductive state by loop supervision circuit 49 so that resistor 45 is in effect interposed in series with resistor 43 in the impedance network. In turn after the required on-hook time has expired, the level detector and timer circuit 63 couples a reset signal to the central processing unit (CPU) 37 which disables the controlled constant current sources 35, 39 and 41 thereby disabling the connection.

Accordingly, there has been shown a novel DC-coupled junctor circuit for signaling across solid-state crosspoint matrix networks. More particularly, the apparatus of the present invention utilizes a pair of controlled variable impedance networks coupled in series with the solid-state crosspoint paths between B+ potential and the DC-coupled junctor diodes to vary the DC current applied to the diodes so that the junctor diodes are selectively forward or reverse biased in response to certain conditions being monitored in the interface circuitry.

Because the current distribution across both sides of the solid-state crosspoint nentwork is controlled by the resistance of the impedance networks provided at the crosspoint network interface circuitry, the crosspoint connections including the junctor diodes can be maintained in their respective conductive states even though they are DC-coupled. Unlike prior art junctor circuits, therefore, the complexity of AC coupling is avoided. Accordingly, since the junctor diodes can now share a common DC current path, one of the variable current sources heretofore required can be eliminated. Finally, it should also be understood that additional functions can be performed by utilizing the principles of the present invention. That is, busy signals and the like can be generated utilizing the present invention by providing additional loop supervision circuits to monitor other conditions in the system and to control additional resistors coupled in series with the serially connected resistors in the impedance networks.

While in the present embodiment, the operation of the apparatus of the present invention including the novel DC-coupled junctor circuit has been described in the context of an internal EPABX call, it should be understood that additional apparatus, shown in FIG. 1, will be provided for making incoming and outgoing telephone calls to and from the EPABX telephone. It should also be noted that while the method and apparatus of the present invention for signaling across solid-state crosspoint matrix networks has been shown and described in the environment of an electronic private automatic branch telephone exchange (EPABX) system, the principles of the present invention can be utilized wherever junctor circuits or the like are used.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention.

What is claimed is:

1. Apparatus for signaling across a solid-state crosspoint matrix network including first and second crosspoint paths comprising:

a source of DC potential;

controlled variable impedance means comprising first and second variable impedance networks respectively coupling said first and second crosspoint paths to said DC potential source; and DC-coupled junctor means intercoupling said first and second crosspoint paths, said DC-coupled junctor means varying the respective levels of DC potential developed at the corresponding junctions of said variable impedance networks and said crosspoint paths responsive to controlled variations in the ratio of the impedances of said variable impedance networks.

2. Apparatus for signaling across a solid-state crosspoint matrix network including first and second crosspoint paths comprising:

a source of DC potential;

controlled variable impedance means comprising first and second variable impedance networks respectively coupling said first and second crosspoint paths to said DC potential source; and junctor means comprising a pair of DC-coupled diodes D.C. intercoupling said first and second crosspoint paths and a constant current means coupled to the junction of said diodes for maintaining the sum of the DC currents conducted through said diodes at a constant level, controlled variations in the ratio of the impedances of said variable impedance networks resulting in an imbalance in the DC current distribution through said diodes and corresponding variations in the respective levels of DC potential developed at the junctions of said variable impedance networks and said crosspoint paths.

3. Apparatus in accordance with claim 2 including a plane of reference potential wherein said diodes each have respective anode and cathode electrodes, said cathodes being DC-coupled at a common junction and said anodes being D.C. coupled to corresponding ones of said crosspoint paths, and wherein said constant current means comprises a constant current sink coupled between said junction of said diode cathodes and said plane of reference potential, and including second and third constant current sinks coupled at respective ones of said diode anodes.

4. Apparatus in accordance with claim 2 including level detection means for monitoring the variations in the respective levels of DC potential developed at the corresponding junctions of said variable impedance networks and said crosspoint paths.

5. Apparatus in accordance with claim 2 wherein each of said variable impedance networks includes a resistive element and switch means for selectively switching said resistive element in and out of said variable impedance network to vary the impedance thereof and wherein said variable impedance network further includes control means for controlling said switch means.

6. Apparatus in accordance with claim 5 wherein said resistive element comprises a first resistor and each of said variable impedance networks includes a second resistor coupled in series with said first resistor between said DC potential source and the corresponding one of said crosspoint paths and wherein said switch means is coupled in shunt with said first resistor to selectively shunt said first resistor with a low impedance and thereby vary the ratio of the impedances of said first and second variable impedance networks.

7. Apparatus in accordance with claim 6 wherein said switch means comprises a transistor having a collector-emitter output circuit and a base electrode, said collector-emitter output circuit being coupled across said first resistor and said base electrode being coupled to said control means, said control means selectively biasing said transistor to conduction to provide a low impedance current path in shunt with said first resistor.

8. Apparatus in accordance with claim 5 wherein said resistive element comprises a first resistor and each of said variable impedance networks includes a second resistor coupled in shunt with the series combination of said switch means and said first resistor between said DC potential source and the corresponding one of said crosspoint paths, said switch means being selectively switched to conduction to shunt said second resistor with said first resistor and thereby vary the ratio of the impedances of said first and second variable impedance networks.

9. Apparatus in accordance with claim 8 wherein said switch means comprises a transistor having a collector-emitter output circuit and a base electrode, said collector-emitter output circuit being coupled in series with said first resistor to shunt said second resistor and said base electrode being coupled to said control means, said control means selectively biasing said transistor to conduction to complete the connection of said first resistor in shunt with said second resistor.

10. In an electronic private automatic branch telephone exchange (EPABX) having a solid-state crosspoint matrix network including a plurality of crosspoint paths for interconnecting telephones, apparatus comprising:

a source of DC potential;

controlled variable impedance means comprising a plurality of variable impedance networks respectively coupling said crosspoint paths to said DC potential source; and DC-coupled junctor means intercoupling first and second ones of said crosspoint paths, said DC-coupled junctor means varying the respective levels of DC potential developed at the junctions of said first and second crosspoint paths and the corresponding ones of said variable impedance networks responsive to controlled variations in the ratio of the impedances of said first and second variable impedance networks.

11. Apparatus in accordance with claim 10 wherein said DC-coupled junctor means comprises a pair of DC-coupled diodes intercoupling said first and second crosspoint paths and a constant current means coupled to the junction of said diodes for maintaining the sum of the DC currents conducted through said diodes at a constant level, controlled variations in the ratio of the impedances of said variable impedance networks resulting in an imbalance in the DC current distribution through said diodes and corresponding variations in the respective levels of DC potential developed at the junctions of said variable impedance networks and said crosspoint paths.

12. Apparatus in accordance with claim 11 including a plane of reference potential wherein said diodes each have respective anode and cathode electrodes, said cathodes being DC-coupled at a common junction and said anodes being coupled to corresponding ones of said crosspoint paths, and wherein said constant current means comprises a constant current sink coupled between said junction of said diode cathodes and said plane of reference potential, and including second and third constant current sinks coupled at respective ones of said diode anodes.

13. Apparatus in accordance with claim 12 wherein said DC-coupled junctor means further includes a constant current sink coupled to the junction of each of said diodes anode and said crosspoint path for signaling from said DC-coupled junctor means across said crosspoint paths, said DC-coupled junctor means further including means for selectively enabling said additional constant current sink to effect an imbalance in the current distribution through said junctor diodes to cause variations in the respective levels of the DC potential developed at the junctions of said crosspoint paths and said variable impedance networks.

14. Apparatus in accordance with claim 10 including means comprising a plurality of interface circuits for coupling said telephones to corresponding ones of said crosspoint paths, each of said interface circuits comprising a transformer having primary and secondary windings, said telephone being coupled across said primary winding and said secondary winding being interposed between a particular one of said crosspoint paths and the corresponding one of said variable impedance networks, said DC-coupled junctor means varying the respective levels of DC potential developed at the junctions of said crosspoint paths and the corresponding ones of said transformer secondary windings responsive to controlled variations in the ratio of the impedances of said first and second variable impedance networks.

15. Apparatus in accordance with claim 14 including level detection means for monitoring the variations in the respective levels of DC potential developed at the corresponding junctions of said transformer secondary windings and said variable impedance network.

16. Apparatus in accordance with claim 14 wherein each of said variable impedance networks includes a resistive element and switch means for selectively switching said resistive element in and out of said variable impedance network to vary the impedance thereof and wherein said variable impedance network further includes loop supervision means for monitoring the corresponding one of said interface circuits and controlling said switch means responsive to current levels in said interface circuit.

17. Apparatus in accordance with claim 16 wherein said resistive element comprises a first resistor and each of said variable impedance networks includes a second resistor coupled in series with said first resistor between said DC potential source and the corresponding one of said crosspoint paths and wherein said switch means is coupled in shunt with said first resistor to selectively shunt said first resistor with a low impedance and thereby vary the ratio of the impedances of said first and second variable impedance networks.

18. Apparatus in accordance with claim 17 wherein said switch means comprises a transistor having a collector-emitter output circuit and a base electrode, said collector-emitter output circuit being coupled across said first resistor and said base electrode being coupled to said loop supervision means, said loop supervision means selectively biasing said transistor to conduction to provide a low impedance current path in shunt with said first resistor.

19. Apparatus in accordance with claim 16 wherein said resistive element comprises a first resistor and each of said variable impedance networks includes a second resistor coupled in shunt with the series combination of said switch means and said first resistor between said DC potential source and the corresponding one of said crosspoint paths, said switch means being selectively switched to conduction to shunt said second resistor with said first resistor and thereby vary the ratio of the impedances of said first and second variable impedance networks.

20. Apparatus in accordance with claim 19 wherein said switch means comprises a transistor having a collector-emitter output circuit and a base electrode, said collector-emitter output circuit being coupled in series with said first resistor to shunt said second resistor and said base electrode being coupled to said loop supervision means, said loop supervision means selectively biasing said transistor to conduction to complete the connection of said first resistor in shunt with said second resistor.

21. The method of signaling across a solid-state crosspoint matrix network in a EPABX system having interface circuitry for coupling telephones to said EPABX, said crosspoint network including a plurality of crosspoint paths for interconnecting said telephones, said EPABX system also including a plurality of variable impedance networks for coupling corresponding ones of said crosspoint paths to a source of DC potential, and a DC-coupled junctor for intercoupling a particular pair of said crosspoint paths, said method comprising:

monitoring said interface circuitry;

varying the impedance of said variable impedance networks responsive to current levels being monitored in said interface circuitry, said DC-coupled junctor varying the respective levels of DC ppotential developed at the corresponding junctions of said variable impedance networks and said corresponding crosspoint paths responsive to variations in the ratio of the impedances of said variable impedance networks; and detecting said DC potential variations to control a second of said interface circuits responsive to conditions monitored in the first of said interface circuits.

* * * * *